(12) United States Patent
Harmer

(10) Patent No.: US 9,253,949 B2
(45) Date of Patent: Feb. 9, 2016

(54) PLANT CULTIVATING POT

(71) Applicant: Gardens Alive! Inc., Lawrenceburg, IN (US)

(72) Inventor: Craig Harmer, Tipp City, OH (US)

(73) Assignee: Gardens Alive!, Inc., Lawrenceburg, IN (US)

( * ) Notice: Subject to any disclaimer, the term of this patent is extended or adjusted under 35 U.S.C. 154(b) by 195 days.

(21) Appl. No.: 13/687,764

(22) Filed: Nov. 28, 2012

(65) Prior Publication Data

US 2014/0144077 A1    May 29, 2014

(51) Int. Cl.
*A01G 9/02* (2006.01)

(52) U.S. Cl.
CPC ...................... *A01G 9/022* (2013.01)

(58) Field of Classification Search
CPC ......... A01G 9/02; A01G 9/021; A01G 9/026; A01G 9/10; A01G 9/022; A01G 1/001; A01G 2031/002; A01G 9/1026; B65D 85/52
USPC ................ 47/65.8, 66.7, 65.7, 66.3, 66.4
IPC ......................................................... A01G 9/02
See application file for complete search history.

(56) References Cited

U.S. PATENT DOCUMENTS

| | | | | |
|---|---|---|---|---|
| 1,740,057 A | * | 12/1929 | Babich | 47/83 |
| 3,310,910 A | | 3/1967 | Titus | |
| 3,394,495 A | * | 7/1968 | Mills | 47/83 |
| 4,123,873 A | * | 11/1978 | Canova | 47/83 |
| 4,779,378 A | | 10/1988 | Mason, Jr. | |
| 5,245,786 A | | 9/1993 | Sorrow | |
| 5,555,675 A | * | 9/1996 | Whisenant | 47/79 |
| 5,715,629 A | * | 2/1998 | Hawkins | 47/65.5 |
| 5,768,825 A | | 6/1998 | Reiger | |
| 5,970,653 A | | 10/1999 | Liang et al. | |
| 6,058,651 A | * | 5/2000 | Perez | 47/65.8 |
| 6,067,747 A | | 5/2000 | Reed | |
| 6,202,348 B1 | | 3/2001 | Reiger | |

(Continued)

FOREIGN PATENT DOCUMENTS

| | | |
|---|---|---|
| GB | 1 486 553 | 9/1977 |
| GB | 2 258 797 A | 2/1993 |

(Continued)

OTHER PUBLICATIONS

Machine translation of JP 2002191234 to Yamamoto, published Jul. 2002.*

(Continued)

*Primary Examiner* — Kathleen Alker
(74) *Attorney, Agent, or Firm* — McKee, Voorhees & Sease, PLC

(57) ABSTRACT

A plant cultivating pot is disclosed. The pot has top and bottom wall spaced apart by a sidewall or panel. The cross-section of the top is larger than the bottom wall so that the sidewall is inwardly sloped from the bottom wall to the top. Openings in the sidewall provide points for planting a plant in media for supporting plant growth from within the interior volume of the body of the pot. The increasing cross-section of the pot from the top to the bottom maximizes exposure of each plant to sunlight. A frusto-pyramidal shaped, non-woven geotextile material provides an optimal shape and material for the body of the pot for growing strawberries.

7 Claims, 4 Drawing Sheets

(56) References Cited

U.S. PATENT DOCUMENTS

| | | |
|---|---|---|
| 6,612,072 B2 | 9/2003 | Busby et al. |
| 7,497,048 B2 | 3/2009 | Bakowski |
| 7,712,255 B1 | 5/2010 | Klessig |
| 7,810,275 B2 | 10/2010 | Whitcomb |
| 7,845,112 B2 * | 12/2010 | Felknor .......................... 47/65.8 |
| 8,234,815 B2 | 8/2012 | Felknor et al. |
| 2005/0166451 A1 * | 8/2005 | Stachnik ........................ 47/65.7 |
| 2005/0223639 A1 | 10/2005 | Whitcomb |
| 2006/0026897 A1 * | 2/2006 | Glover ........................... 47/65.8 |
| 2007/0157513 A1 * | 7/2007 | Varney et al. .................. 47/65.8 |
| 2008/0216403 A1 | 9/2008 | Schmidt et al. |
| 2009/0265984 A1 * | 10/2009 | Weder ............................. 47/66.7 |
| 2009/0293350 A1 | 12/2009 | Kania et al. |
| 2011/0283616 A1 | 11/2011 | Kang |
| 2013/0055636 A1 * | 3/2013 | Ager .............................. 47/66.7 |
| 2013/0255148 A1 * | 10/2013 | Setzer ............................... 47/33 |

FOREIGN PATENT DOCUMENTS

| | | | | |
|---|---|---|---|---|
| GB | 2 331 444 A | | 5/1999 | |
| JP | 2002191234 A | * | 7/2002 | ............... A01G 9/02 |
| JP | 2004187646 A | * | 7/2004 | ............... A01G 9/02 |
| WO | WO 99/01023 A1 | | 1/1999 | |
| WO | WO 03/096791 A1 | | 11/2003 | |

OTHER PUBLICATIONS

Machine translation of JP 2004187646 to Matsuo, published Jul. 2004.*

* cited by examiner

PLANT CULTIVATING POT

BACKGROUND OF THE INVENTION

With the increasing interest in gardening but with a limited amount of time and space to dedicate to it, container gardens have become very popular. Coincidentally, growing your own vegetables has become trendy. Traditional gardening requires time to till, prepare, plant, and nurture soil that may not contribute directly to the overall success of a plant. Traditional gardening also requires horizontal space that may not be available and the added time required to dig up the harvest. The inefficiencies of traditional gardening are also becoming more difficult to justify. For example, a large amount of soil is watered and fertilized that may not necessarily contribute to the growth and success of a plant. Controlling the growing environment and characteristics of a traditional garden, such as aeration, drainage, heat dissipation, etc., also highlights some of the added inefficiencies of traditional horizontal gardening. Direct exposure to sunlight can also be blocked by larger plants in traditional horizontal gardening. And, in limited planting spaces, unwanted shading and weeding is often a concern.

SUMMARY OF THE INVENTION

Therefore, one object of the present invention is to provide a plant cultivating pot configured to support vertical planting thereby maximizing a plants exposure to sunlight and minimizing the footprint required for the pot. Advantageously, the pot may be constructed of a non-woven geotextile that supports a balanced exchange of air and water to the environment within the pot. The pot air prunes roots for maximum mass and volume, stops root circling, aerates the root zone, drains at optimal rates and dissipates heat to provide an optimal growing environment. The pot is also collapsible and thereby easy to store and reuse.

According to one aspect of the invention, a plant cultivating pot is disclosed. The pot includes a material body with a top spaced above a bottom wall wherein the top has a smaller cross-section than the bottom wall. A collapsible sidewall extends between the top and bottom wall defining an interior volume adapted to house media for supporting plant growth. The plant cultivating pot is configurable between non-use and use configurations. In the non-use configuration, the top and bottom walls are generally coplanar, and in the use configuration the top and bottom walls are separated by the length of the sidewall. An opening is provided in the sidewall. The opening is adapted for receiving a plant. The sloped sidewall minimizes shading of the lower plants from those above.

According to another embodiment of the present invention, a fabric pot for growing strawberries is disclosed. The fabric pot includes a top spaced above a bottom wall. The top has a smaller cross-section than the bottom wall. A collapsible panel extends at a slope between the top and bottom wall defining a fabric body having an interior volume adapted to house media for supporting plant growth. The collapsible panel has one or more openings adapted for a strawberry plant to be planted in the planting media housed within the pot.

According to another embodiment of the present invention, a method for growing plants in a fabric pot is disclosed. A collapsible fabric body is provided having a top and opposite bottom wall connected by inwardly sloping panels. Beneficially, the top has a smaller cross-section than the bottom wall. The collapsible body is expanded by separating the bottom wall from the top to access an opening in the inwardly sloping panel of the collapsible fabric body. The fabric body is filled through the top with media for supporting plant growth and plants are planted in the opening in the inwardly sloping panel. In one aspect, the fabric body is expanded into a frusto-pyramidal shape.

DETAILED DESCRIPTION OF THE PREFERRED EMBODIMENTS

Figure 1:
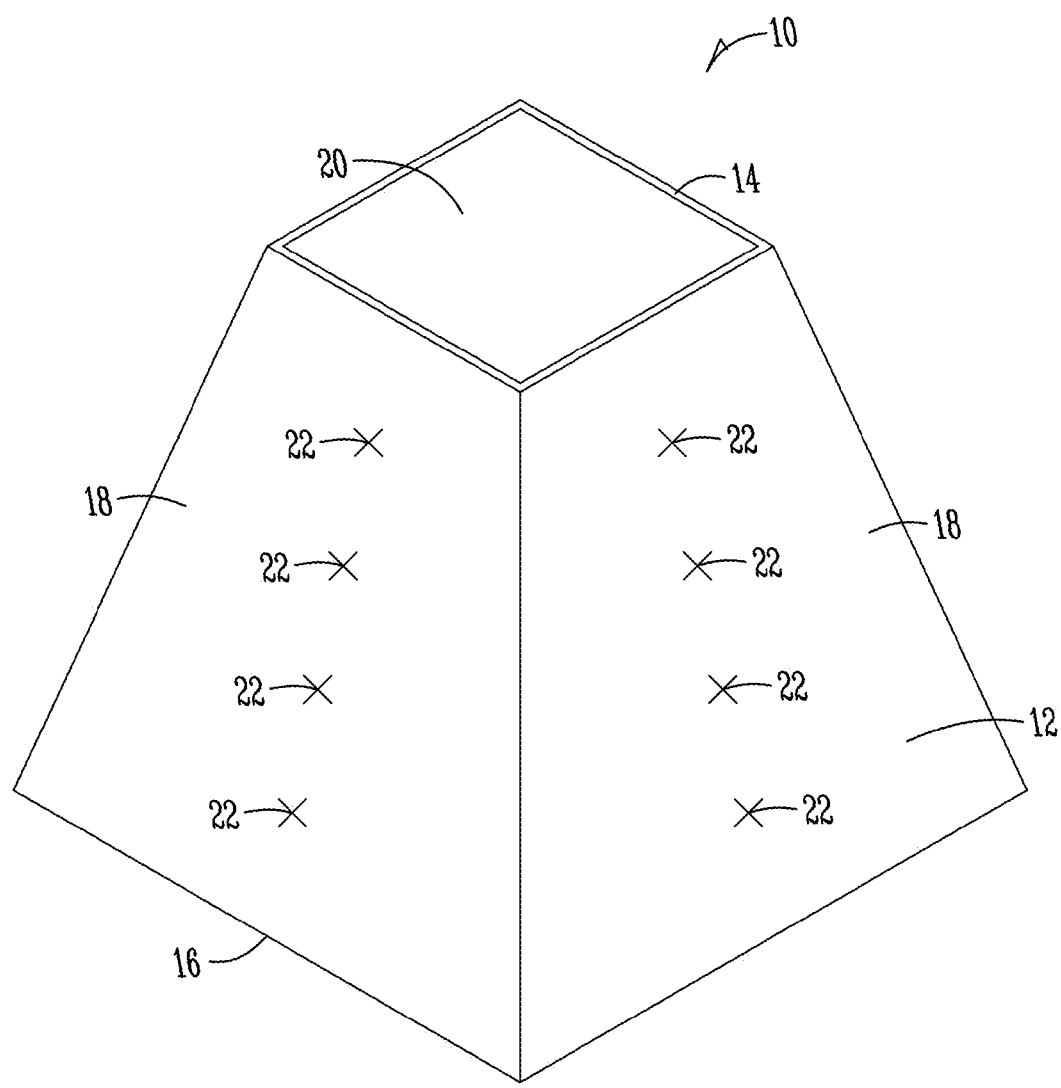
FIG. 1 is a perspective view of a plant cultivating pot according to an exemplary aspect of the present invention.
Figure 2:
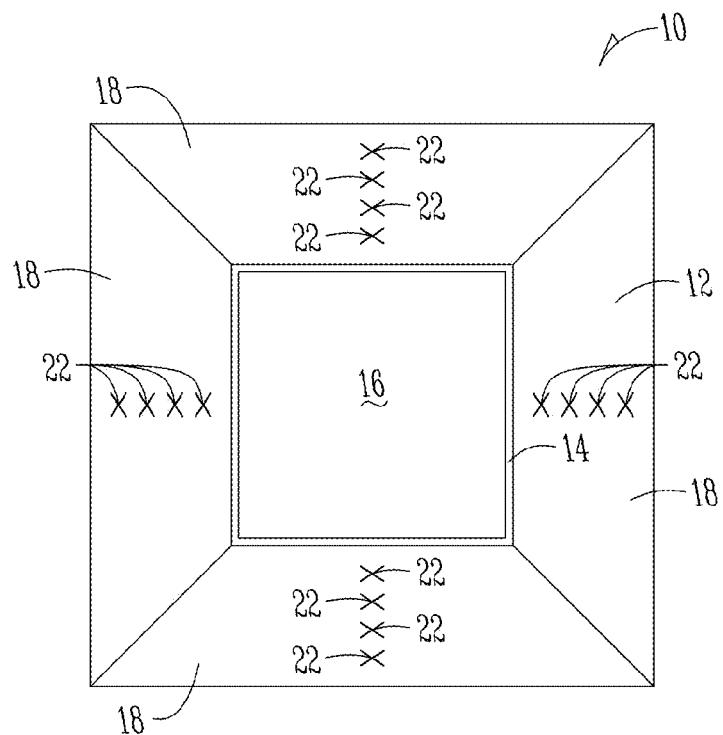
FIG. 2 is a top view of the pot shown in FIG. 1.
Figure 3:
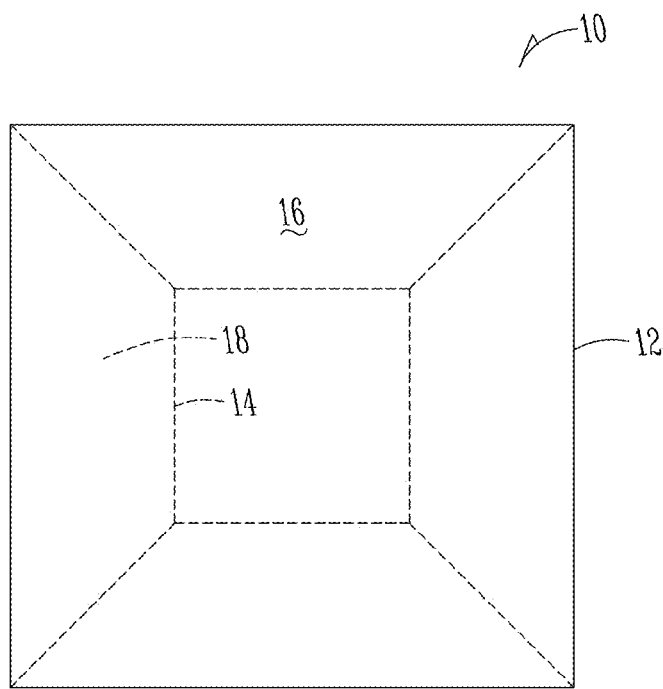
FIG. 3 is a bottom view of the pot shown in FIG. 1.

Exemplary illustrations of the present invention, namely a plant cultivating pot, are shown in FIGS. 1-6. The pot 10 includes a body, such as a material or fabric body. The material may be plastic, vinyl, or a non-woven geotextile. According to one aspect of the present invention, the pot 10 includes a fabric body 12 constructed from a non-woven geotextile material. The body 12 of the pot 10 includes a top 14 which is open but may be configured to be selectively closed. The body 12 also includes a bottom wall 16 which is closed but could be designed to be selectively openable by alterations to the material defining the bottom wall 16. A sidewall 18 extends between the bottom wall 16 and the top 14, connecting the top 14 to the bottom wall 16 of the body 12. The sidewall 18 is also referred to as a panel, and therefore the body 12 could be described as having a panel 18 extending between the bottom wall 16 and top 14. Each sidewall 18 is connected to another sidewall along a generally vertically extending edge or seam. The sidewall 18 is connected to the top 14 along a generally horizontal edge or seam. The bottom of the side wall 18 is connected to the bottom wall 16 along a generally horizontal edge or seam.

According to one embodiment of the present invention, the body 12 is frusto-pyramidal in shape. An interior volume 20 is defined within the body 12 of the pot 10. Access to the interior volume 20 is provided at least through top 14 wherethrough media for supporting plant growth is introduced into the interior volume 20 of the pot 10. In one aspect of the invention, the pot 10 includes four sidewalls 18 sloped inwardly from the bottom wall 16 to the top 14. The present invention contemplates that the pot 10 may include three sidewalls forming a frusto-triangular shape or a single continuous sidewall forming a frusto-conical shaped pot 10. The shape of the pot 10 may also be configured in other frusto-polygonal shapes such as a frusto-quadrilateral shape, frusto-pentagonal shape, frusto-hexagonal shape, frusto-heptagonal shape, frusto-octagonal shape, etc. Accordingly, the shape of the pot 10 is not limited to a certain number of sidewalls 18. Advantageously, the sidewalls 18 in the embodiments of the present invention are sloped inwardly from the bottom wall 16 toward the top 14 so that a plant 30 (see FIG. 4) located closer to the bottom wall 16 is farther away from the center vertical plane 34 than a plant 30 located closer to the top 14. In the sidewall 18 of the body 12 of the pot 10 is an opening 22 through which a plant 30 is planted in the media for supporting plant growth 28 within the interior volume 20 of the pot 10. A series of openings 22 may be configured into the sidewall 18 extending generally in a vertical direction along the height of the sidewall 18 from the bottom wall 16 to the top 14. The openings 22 may also be spaced in the sidewall 18 in a generally serpentine pattern or a zigzag pattern to provide additional spacing between each plant 30. As illustrated in FIGS. 1, 2, and 4-6, each of the openings 22 includes four triangular flaps in contact with each other and co-planar in the non-use configuration.

An exemplary configuration of a plant cultivating pot 10 of the present invention may include a bottom wall having edges equal distance in length (e.g., 12 inches in length). The distance between the bottom wall 16 and the top 14 could be in between a foot and a foot and a half. Using these or similar dimensions, the interior volume 20 of the pot 10 may be configured to hold three to four gallons of media for supporting plant growth 28 (e.g., roughly one 16 quart bag of potting soil). In this embodiment, the sidewall 18 could include four openings 22 spaced equal distances between the bottom wall 16 and the top 14. Where the body 12 of the pot 10 is a frusto-pyramidal shape, 16 openings 22 may be provided on the collective four sidewalls 18. An additional couple of plants may also be planted in the top 14 of the body 12 bringing the total number of plants to 18. Beneficially, the body 12 of the above-exemplary embodiment only requires a one square foot footprint for the 18 plants. Conversely, in a traditional horizontal garden, 18 plants might occupy 63 square feet of space based upon a plant spacing of roughly one and a half feet apart. Although specific dimensions and volumes are provided, the above embodiment is but one example of a plant cultivating pot of the present invention. The pot may be configured to have dimensions and a volume different from those provided above by way of example only.

The present invention contemplates that the number of openings, the size of the sidewall, the footprint of the bottom wall, and the slope of the sidewall may be changed to accommodate any number of plants within reason. The slope of the sidewall 18 may be altered to accommodate the various size of plants 30 to be planted in the pot 10 based on the size and growth of the foliage to prevent plants 30 positioned closer to the top 14 from casting a shadow on plants 30 closer to the bottom. The greater the slope or the taper of the sidewall 18, the less chance there is of the upper positioned plants 30 casting a shadow on the lower positioned plants as the sun (see FIG. 4) moves across the sky. Beneficially, the sloped sidewall 18 of the pot 10 allows each of the plants 30 to receive sunlight 36 from the sun 38 as the sun moves across the sky. Even, for example, when the sun 38 is directly above the pot 10, the sunlight 36 is able to reach generally all the plants 30 planted in the sidewall 18 of the pot 10. This is not the case in a pot where the sidewall is vertical as the upper positioned plants would cast a shadow on any lower positioned plants thereby limiting the sunlight exposure of the lower positioned plants. Therefore, it is an advantage of the present invention to provide a pot 10 that includes a top 14 having a smaller cross-section than the bottom wall 16 which defines a degree of tapering or sloping for the sidewall 18 extending between the bottom wall 16 and the top 14. The difference in the cross-sectional size of the top 14 and the bottom wall 16 generally defines the slope of the sidewall 18 extending between the bottom wall 16 and top 14.

Figure 4:
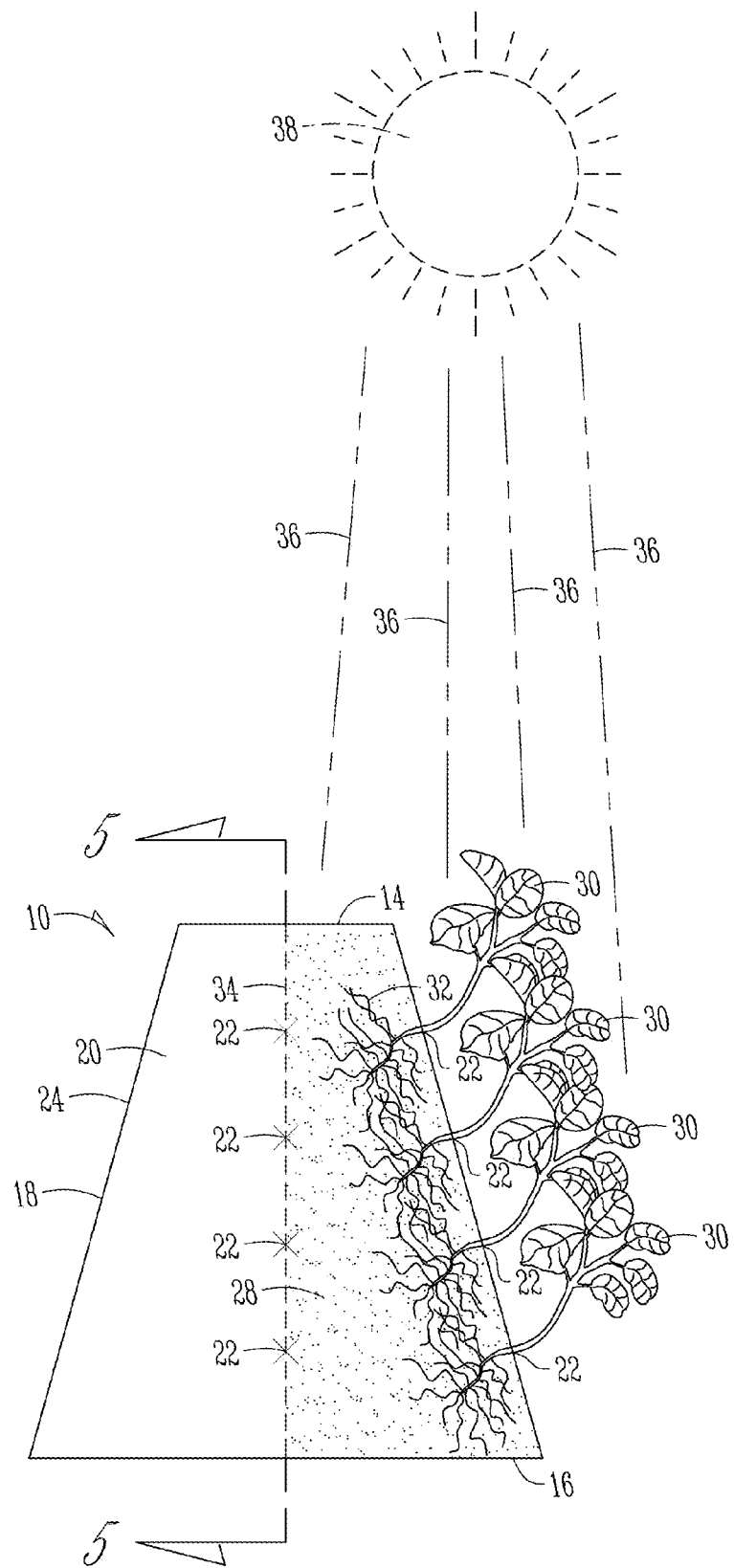
FIG. 4 is a side elevation view of a use configuration for a plant cultivating pot according to an embodiment of the present invention.
Figure 5:
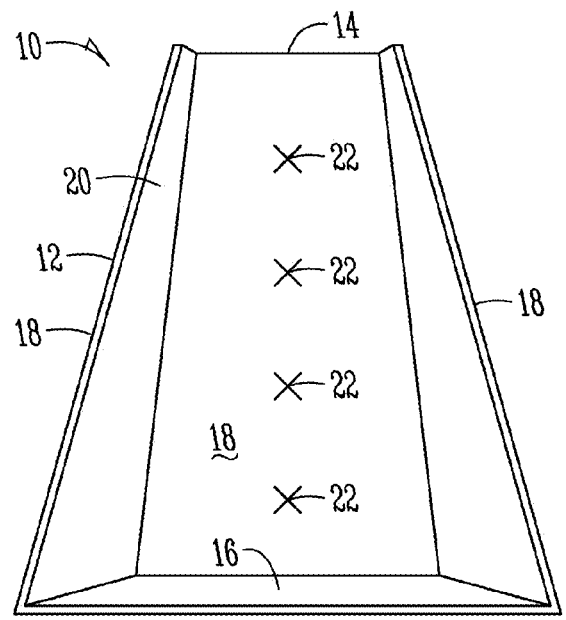
FIG. 5 is a sectional view of the pot shown in FIG. 4 taken along line 5-5.
Figure 6:
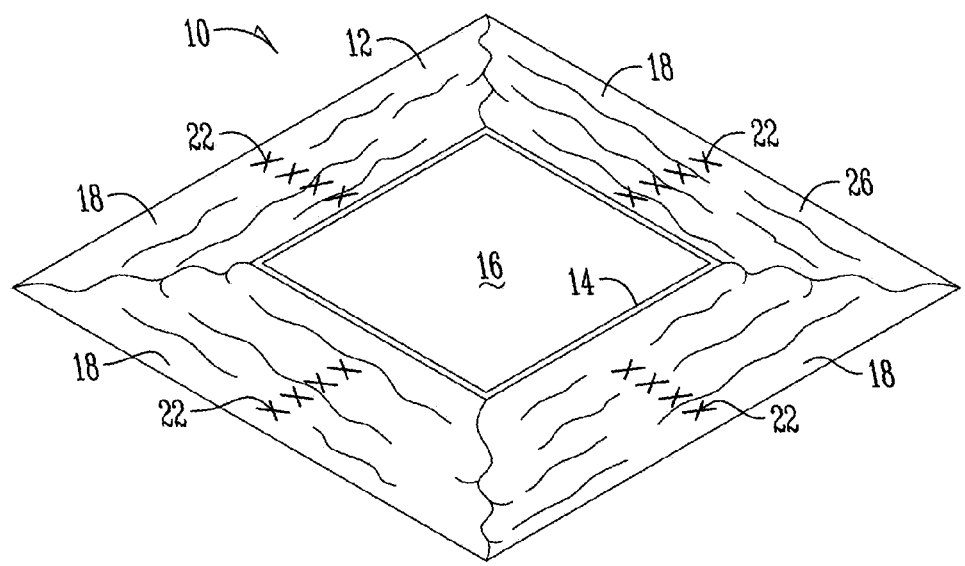
FIG. 6 is an illustration of a non-use configuration for a plant cultivating pot of the present invention.

In use, the pot 10 is configurable between a use configuration 24 as best illustrated in FIGS. 1 and 4 and a non-use configuration 26 as best illustrated in FIG. 6. The pot 10 may be shipped and stored, for example, in the non-use configuration 26. In the non-use configuration 26, the top 14 is generally coplanar with the bottom wall 16. Thus, the top 14 and the sidewall(s) 18 rest on the bottom wall 16. The use of a material, such as a geotextile material, for the body 12 allows the pot 10 to be folded up, rolled up, or otherwise stored when not in use. To configure the pot 10 in the use configuration 24, shown for example in FIGS. 1 and 4, the top 14 is separated from the bottom wall 16 whereby the sidewalls 18 are taunt and define an open, interior volume 20. Media for supporting plant growth 28 is placed inside the interior volume 20 of the pot 10 through the top 14. The media for supporting plant growth 28 supports each of the sidewalls 18, the top 14, and the bottom wall 16 in the use configuration 24. A plant 30 is inserted in an opening 22 in the sidewall 18. The roots 32 are supported by the plant growth media in the pot 10 and the plant foliage extends through the opening 22 and along or away from the sidewall 18 of the pot 10. Although not illustrated in FIG. 4, additional plants may be planted in the top 14 to expand the plant holding/carrying capacity of the pot 10. Beneficially, a geotextile material used for the body 12 of the pot 10 allows for free passage of air and water through the sidewall(s) 18 aiding in fibrous root development of the plant 30. The sloped sidewall 18 maximizes the plants exposure to sunlight 36. Using a non-woven geotextile material for the body 12 of the pot 10, the plants 30 may be watered through the top 14 and/or by application of water onto/through the material body 12 of the pot 10.

Upon completion of the growing season, the media for supporting plant growth 28 within the interior volume 20 of the pot 10 may be removed by emptying the media through the top 14. The sidewall 18, top 14, or bottom wall 16 of the body 12 may include one or more handles for gripping the body 12 of the pot 10 for handling, for transporting and moving the pot about.

The pot 10 is adapted to grow various types of plants. Advantageously, the pot 10 is configured to grow strawberries. In another embodiment, the pot 10 is configured to grow herbs, perennials, vining plants, and annual plants. The pot 10 may also be configured to grow other subterranean plants such as potatoes, beets, etc. Upon emptying the media for supporting plant growth 28 from the interior volume 20 the body 12 of the pot 10 may be reconfigured to the non-use configuration 26 shown in FIG. 6 from the use configuration shown, for example, in FIG. 4. For harvesting subterranean plants, the media for supporting plant growth 28 is emptied from the interior of volume 20 along with the vegetable or other plant growth. For example, in the case of growing strawberries, the fruit may be easily harvested from the plants 30. Depending on the type of the material used, the pot 10 may be cleaned, such as for example, by washing and then stored for the next growing season. Beneficially, a non-woven geotextile material, after the media for supporting plant growth 28 has been removed from the interior volume 20, may be easily cleaned, such as for example by washing, before storing in the non-use configuration 26 shown in FIG. 6. The use of one or more handles positioned on the sidewall 18, top 14 or bottom wall 16 of the pot 10 allows the pot 10 to be moved to a desired location depending on the exposure to sun, the exterior temperature, exposure to precipitation, etc.

Embodiments of the present invention have been set forth in the drawings and in the specification and although specific terms are employed, these are used in the generically descriptive sense only and are not used for the purpose of limitation. Changes in the form proportion of the parts as well as substitution of equivalence are contemplated as circumstances may suggest or are rendered expedient without departing from the spirit and scope of the invention as further defined in the following claims.

What is claimed is:

1. A plant cultivating pot comprising:

a material body comprising a top, a plurality of collapsible sidewalls, and a bottom wall extending between the plurality of collapsible sidewalls, wherein the top has a smaller cross-section than the bottom wall, and further wherein the material body is formed only of a geotextile and seam connections;

wherein each of the plurality of collapsible sidewalls having at least one opening adapted for receiving a plant, each at least one opening being formed from four triangular flaps;

wherein the material body has a use configuration wherein:
  (a) the plurality of collapsible sidewalls has a length extending between the top and the bottom wall defining an interior volume adapted for housing media for supporting plant growth;
  (b) the top and the bottom wall are separated by the length of the plurality of collapsible sidewalls;
  (c) the top is spaced above the bottom wall;
  (d) the bottom wall is configured to rest upon a surface;
  (e) the housing media supports vertical weight forces of each of the plurality of collapsible sidewalls; and wherein the material body has a non-use configuration wherein the top and the bottom wall are substantially coplanar, and the plurality of collapsible sidewalls are in a collapsed state, and the triangular flaps of the at least one opening contact each other and are co-planar.

2. The pot of claim 1 wherein the body is generally frusto-pyramidal in shape.

3. The pot of claim 1 wherein the top is open and the bottom wall is closed.

4. The pot of claim 1 wherein the at least one opening comprises four openings, and further wherein each of the plurality of collapsible sidewalls includes a singular column of the four openings.

5. The pot of claim 1 wherein the plurality of collapsible sidewalls is sloped inward from the bottom wall to the top wall.

6. The pot of claim 1 wherein the at least one opening further comprises a series of openings, the series of openings aligned between the bottom wall and the top, one on top of another.

7. The pot of claim 6 wherein an opening of the series of openings near the bottom wall is spaced farther away from a center vertical plane than an opening of the series of openings near the top, the center vertical plane extending between the bottom and the top.

* * * * *